(12) United States Patent
Sakamoto et al.

(10) Patent No.: US 8,714,329 B2
(45) Date of Patent: May 6, 2014

(54) ELECTROMAGNETIC CLUTCH

(75) Inventors: Yoichi Sakamoto, Anjo (JP); Kenji Korenaga, Anjo (JP); Minoru Onitake, Kariya (JP); Hiroshi Takuno, Aichi (JP); Takashi Hosokawa, Takahama (JP); Hirotatsu Kitabatake, Susono (JP); Hideaki Komada, Gotenba (JP); Hiroaki Ebuchi, Hadano (JP); Hiroto Hashimoto, Susono (JP)

(73) Assignee: JTEKT Corporation, Osaka-shi (JP)

( * ) Notice: Subject to any disclaimer, the term of this patent is extended or adjusted under 35 U.S.C. 154(b) by 273 days.

(21) Appl. No.: 13/285,671

(22) Filed: Oct. 31, 2011

(65) Prior Publication Data
US 2012/0103750 A1      May 3, 2012

(30) Foreign Application Priority Data
Nov. 1, 2010   (JP) .................................. 2010-245511

(51) Int. Cl.
*F16D 27/06*      (2006.01)
(52) U.S. Cl.
USPC .................. 192/84.7; 188/161; 192/84.95
(58) Field of Classification Search
USPC .............................................. 192/54.4, 84.7
See application file for complete search history.

(56) References Cited

U.S. PATENT DOCUMENTS

| | | | | |
|---|---|---|---|---|
| 4,079,821 A | * | 3/1978 | Miller | 192/84.7 |
| 4,352,415 A | * | 10/1982 | Powell | 188/163 |
| 2003/0094343 A1 | * | 5/2003 | Showalter | 192/84.7 |

FOREIGN PATENT DOCUMENTS

JP          2004-17807         1/2004

* cited by examiner

*Primary Examiner* — Rodney Bonck
(74) *Attorney, Agent, or Firm* — Oblon, Spivak, McClelland, Maier & Neustadt, L.L.P.

(57) ABSTRACT

An electromagnetic clutch includes a rotating member; an electromagnetic coil that is arranged on a rotational axis of the rotating member and generates electro-magnetic force; an output mechanism that has an armature to which return force in a direction away from the electromagnetic coil is applied by a return spring; a cam mechanism that is juxtaposed along the rotational axis to the output mechanism, and has a control cam that is unable to rotate relative to the rotating member, and a cam follower that is able to roll between the control cam and the armature; and a relative rotation restricting device that is arranged on an axis of the cam mechanism, and that is configured to restrict relative rotation between the armature and the control cam when the electromagnetic coil is in a de-energized state.

8 Claims, 4 Drawing Sheets

<ELECTROMAGNETIC CLUTCH IN DRIVEN STATE>

<ELECTROMAGNETIC CLUTCH IN NON-DRIVEN STATE>

<ELECTROMAGNETIC CLUTCH IN DRIVEN STATE>

<ELECTROMAGNETIC CLUTCH IN NON-DRIVEN STATE>

ELECTROMAGNETIC CLUTCH

INCORPORATION BY REFERENCE

The disclosure of Japanese Patent Application No. 2010-245511 filed on Nov. 1, 2010 including the specification, drawings and abstract is incorporated herein by reference in its entirety.

BACKGROUND OF THE INVENTION

1. Field of the Invention

The invention relates to an electromagnetic clutch for controlling the transmission of torque between rotating members or the braking of a rotating member.

2. Description of the Related Art

Japanese Patent Application Publication No. 2004-17807 (JP-A-2004-17807), for example, describes a related electromagnetic clutch that includes an output mechanism that outputs moving force by generating electro-magnetic force, and a cam mechanism that operates by the driving of an electric motor on the axis of this output mechanism.

The output mechanism of the electromagnetic clutch has an electromagnetic coil that generates electro-magnetic force, and an armature that moves in response to the electromagnetic coil being energized. This output mechanism is arranged on a periphery of an output shaft.

The electromagnetic coil is housed in a coil housing that rotates together with the output shaft, and is fixed to the vehicle body side.

The armature is arranged in a position facing the electromagnetic coil via a bottom portion of the coil housing. Also, the armature is configured to friction engage with the coil housing in response to output from the output mechanism. Also, the armature is arranged so as to move away from the coil housing by the spring force of a return spring when the output mechanism stops outputting moving force.

The cam mechanism has a gear that rotates by the driving of the electric motor, and a cam follower interposed between the gear and the armature, and is arranged on the axis of the output mechanism.

The gear is arranged so as to be able to rotate around the periphery of the output shaft, and is coupled to an input shaft (i.e., a motor shaft of the electric motor) via a speed reducing gear train.

The cam follower is formed by a spherical member, and is rollably arranged between the gear (i.e., a cam groove therein) and the armature (i.e., a cam groove therein).

According to the structure described above, when the electromagnetic coil is in an energized state when the electric motor is being driven, the armature moves to the electromagnetic coil side and friction engages with the coil housing. Consequently, the cam mechanism operates. Therefore, the cam action from operation of the cam mechanism causes the armature to friction engage more strongly than before the cam mechanism is operated, such that the driving torque of the electric motor is transmitted via the cam mechanism and the like to the output shaft (i.e., to the differential side).

On the other hand, when the electromagnetic coil is in a de-energized state (i.e., not energized) when the electric motor is stopped, the cam mechanism does not operate, so friction engagement between the armature and the coil housing is canceled by the spring force of the return spring. As a result, the transmission of driving torque from the electric motor to the differential side is interrupted.

In the electromagnetic coil described in JP-A-2004-17807, if there is a sudden change in the rotation speed of the cam member when the electromagnetic coil is de-energized, the armature is unable to follow this sudden change in rotation speed because the armature tends to rotate from inertia, resulting in relative rotation between the cam member and the armature. As a result, the cam mechanism may operate erroneously, such that the armature ends up friction engaging with the coil housing when the electromagnetic coil is not energized. Therefore, in order to prevent this friction engagement, there is a need to restrict acceleration of the armature.

SUMMARY OF THE INVENTION

In view of this problem, the invention provides an electromagnetic clutch capable of suppressing erroneous operation of a cam mechanism due to sudden acceleration thereof when the electromagnetic coil is not energized.

A first aspect of the invention relates to an electromagnetic clutch that includes a rotating member; an electromagnetic coil that is arranged on a rotational axis of the rotating member and generates electro-magnetic force; an output mechanism that has an armature to which return force in a direction away from the electromagnetic coil is applied by a return spring; a cam mechanism that is juxtaposed along the rotational axis to the output mechanism, and that has a cam member that is unable to rotate relative to the rotating member, and a cam follower that is able to roll between the cam member and the armature; and a relative rotation restricting device that is arranged on an axis of the cam mechanism, and that is configured to restrict relative rotation between the armature and the cam member when the electromagnetic coil is in a de-energized state.

Also, in this electromagnetic clutch, the armature and the cam member may each have a cam groove formed by a concave groove with a depth in an axial direction that changes along a circumferential direction.

Also, in the electromagnetic clutch described above, the relative rotation restricting device may include a retainer that is interposed between the armature and the cam member, and that rollably retains the cam follower, and may restrict the relative rotation by the retainer friction engaging with the armature and the cam member in response to receiving spring force of the return spring.

Also, in the electromagnetic clutch described above, the retainer may have a thickness that is set to a dimension that is the same as an axial dimension between the armature and the cam member when the electromagnetic coil is in a de-energized state. Still further, the retainer may have a thickness that is set to a dimension that is larger than an axial dimension between the armature and the cam member when the electromagnetic coil is in a de-energized state.

Also, in the electromagnetic clutch described above, the relative rotation restricting device may include a pair of spline engaging portions that are interposed between the armature and the rotating member and that are able to engage together, and may restrict the relative rotation by the armature spline engaging the pair of spline engaging portions together in response to receiving spring force of the return spring.

Further, in the electromagnetic clutch described above, the pair of spline engaging portions may have an axial length that is set to a dimension in which a spline engaged state is cancelled by the armature moving in response to the electromagnetic coil being energized.

Also, in the electromagnetic clutch described above, one spline engaging portion of the pair of spline engaging portions may be provided on an inner peripheral surface of the armature, and the other spline engaging portion may be provided on an outer peripheral surface of the rotating member.

According to the invention, friction engagement of the armature is able to be suppressed by suppressing erroneous operation of the cam mechanism when the electromagnetic coil is not energized.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

An electromagnetic clutch according to a first example embodiment of the invention will hereinafter be described in detail with reference to the accompanying drawings.

Figure 1:
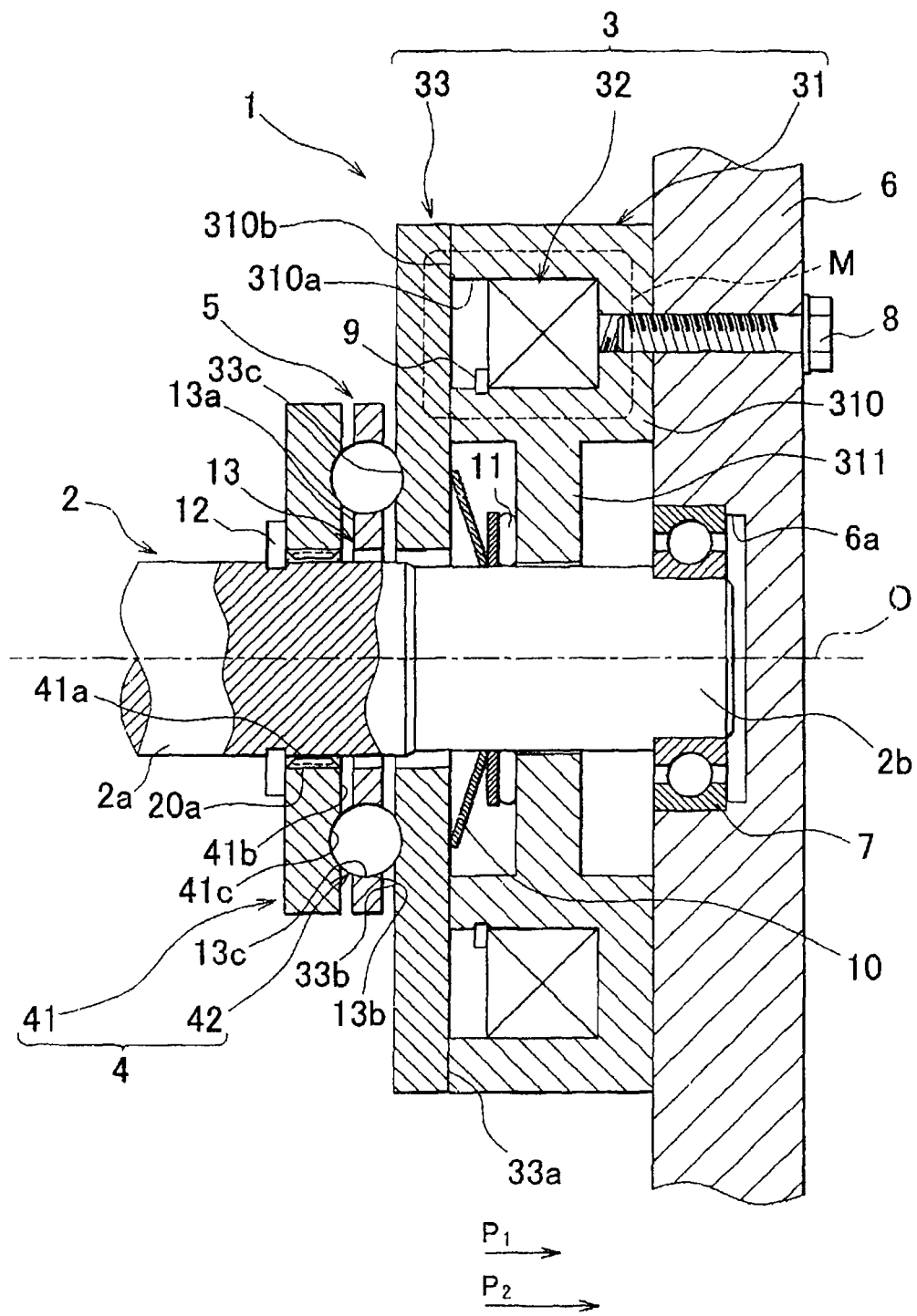
FIG. 1 is a sectional view of an electromagnetic clutch according to a first example embodiment of the invention, in a driven state.
Figure 2:
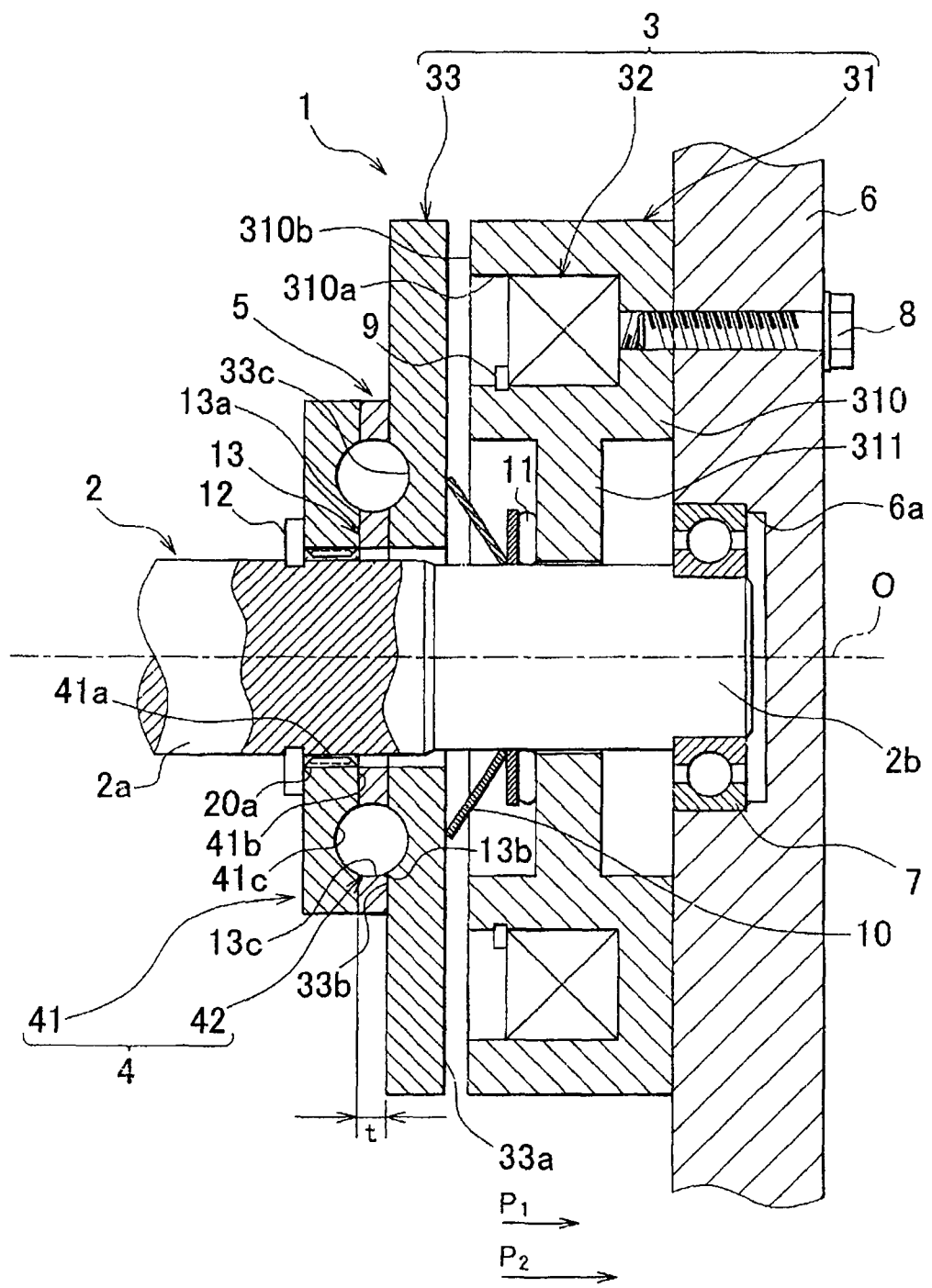
FIG. 2 is a sectional view of the electromagnetic clutch according to the first example embodiment of the invention, in a non-driven state.

FIG. 1 is a view of the electromagnetic clutch in a driven state, and FIG. 2 is a view of the electromagnetic clutch in a non-driven state. As shown in FIGS. 1 and 2, the electromagnetic clutch 1 basically includes a rotating member 2 that rotates together with an input shaft, not shown, an output mechanism 3 that is arranged on a rotational axis O of this rotating member 2, a cam mechanism 4 that converts the rotating force from the rotating member 2 into thrust in the direction of the rotational axis O by operating in response to output from this output mechanism 3, and a relative rotation restricting device 5 that is arranged on the axis of this cam mechanism 4.

The electromagnetic clutch 1 functions as a brake device for braking the rotating member 2 with respect to a casing 6 that serves as a non-rotating member, and is used at times such as when switching a torque transmission path according to a planetary gear set, not shown, for example. A shaft hole 6a is provided in the casing 6, and is open on an inner surface of the casing 6.

The rotating member 2 is formed by a solid round shaft that has two body portions, i.e., a large body portion 2a and a small body portion 2b, that have different outside diameters. This rotating member 2 is coupled to a motor shaft (i.e., an input shaft) of an electric motor, not shown, via a reduction gear mechanism, also not shown, and is rotatably supported in the shaft hole 6a (only one is shown) of the casing 6 via a bearing 7.

The rotating member 2 is configured to rotate together with the input shaft by the driving of the electric motor.

The large diameter body portion 2a has a straight spline engaging portion 20a and is arranged on one side (i.e., the electric motor side) of the rotating member 2. The small diameter body portion 2b is arranged on the other side (i.e., the casing 6 side) of the rotating member 2, and is integrally connected to the large diameter body portion 2a.

The output mechanism 3 has a coil housing 31 that doubles as a coil holder, an electromagnetic coil 32 that generates electro-magnetic force within this coil housing 31, and an armature 33 that moves in response to the electromagnetic coil 32 being energized. This output mechanism 3 is arranged around the periphery of the rotating member 2.

Also, the output mechanism 3 is configured to output moving force to the armature 33 by generating electro-magnetic force that becomes pushing force $P_1$ with respect to the coil housing 31, with the electromagnetic coil 32.

The coil housing 31 is formed by an annular member that has a coil holder 310 that serves as a yolk, and an inner flange 311, and that is fixed to the casing 6 by a fastening bolt 8. The rotating member 2 extends completely through the coil housing 31.

The coil holder 310 has an annular coil housing portion 310a that opens on the armature 33 side, and is arranged on the outer peripheral side of the coil housing 31. A friction surface 310b that is directed toward the end surface on the coil housing 31 side of the armature 33 is provided on the coil holder 310.

The inner flange 311 is arranged on the inner peripheral side of the coil housing 31, and is integrally formed with the inner peripheral surface of the coil holder 310.

The electromagnetic coil 32 is housed, facing the armature 33, in the coil housing portion 310a of the coil housing 31, and is retained by a snap ring 9. Also, the electromagnetic coil 32 is configured to create a magnetic circuit M that straddles the armature 33 and the coil housing 31 and the like by being energized.

The armature 33 is formed by an annular member that has a friction surface 33a that faces the friction surface 310b of the coil housing 31, and a friction surface 33b that is directed toward the relative rotation restricting device 5 side. This armature 33 is arranged relatively rotatable, and relatively movable, around the periphery of the rotating member 2 on the cam mechanism 4 side of the output mechanism 3. The rotating member 2 extends completely through the armature 33.

Also, the armature 33 is configured such that the friction surface 33a friction engages at a pressure $P_1$ with the friction surface 310b of the coil housing 31, when the armature 33 moves in the axial direction in response to output from the output mechanism 3.

Also, the armature 33 has a cam groove 33c that is open on an end surface that is on the opposite side of the output mechanism 3 from the coil housing side end surface. The armature 33 functions as a constituent element of the cam mechanism 4 together with a control cam (also referred to as a cam member) 41 and a cam follower 42 that are constituent elements of the cam mechanism 4 that will be described later, such that the friction surface 33a friction engages at a pressure $P_2$ ($P_1 < P_2$) that is greater than the pressure $P_1$ with the friction surface 310b of the coil housing 31 by the cam action from operation of the cam mechanism 4. The cam groove 33c is formed by a concave groove with a depth in the axial direction that changes along the circumferential direction of the armature 33.

Return force in a direction away from the electromagnetic coil 32 is constantly applied to the armature 33 by a return spring 10. This return spring 10 is formed by a diaphragm spring, for example, and is arranged around the periphery of the rotating member 2, interposed between the armature 33 and a bearing 11 on the coil housing 31 (i.e., the inner flange 311).

The cam mechanism 4 includes the control cam 41 that serves as a cant member, and the cam follower 42 that is interposed between this control cam 41 and the armature 33. This cam mechanism 4 is arranged around the periphery of the rotating member 2.

The control cam 41 has a straight spline engaging portion 41a corresponding to the straight spline engaging portion 20a of the rotating member 2, and is arranged around the periphery of the large diameter body portion 2a of the rotating member 2 on the electric motor side of the cam mechanism 4, in a non-rotatable yet movable manner with respect to the rotating member 2. The control cam 41 is restricted from moving in the axial direction (toward the electric motor side) by a snap ring 12.

A friction surface 41b that is directed toward the relative rotation restricting device 5 side, and a cam groove 41c that opens on this friction surface 41b, are provided on the control cam 41. The cam groove 41c is formed by a concave groove with a depth in the axial direction that changes along the circumferential direction of the control cam 41.

The cam follower 42 is formed by a spherical member, and is rollably arranged between the cam groove 41c of the control cam 41, and the cam groove 33c of the armature 33 for rolling over a distance limited by the configuration of the cam grooves 33c and 41c.

The relative rotation restricting device 5 includes the return spring 10, the snap ring 12, and a retainer 13, and is arranged on the axis of the cam mechanism 4.

The retainer 13 has a first friction surface 13a facing the friction surface 41b of the control cam 41, and a second friction surface 13b that faces the friction surface 33b of the armature 33. The retainer 13 is arranged around the periphery of the rotating member 2, interposed between the control cam 41 and the armature 33.

Also, the retainer 13 is configured to restrict relative rotation between the control cam 41 and the armature 33 by having the retainer thickness be set to the same dimension t as the axial dimension between the control cam 41 and the armature 33 when spring force of the return spring 10 is received when the electromagnetic coil 32 is in a de-energized state, such that the first friction surface 13a friction engages with the friction surface 41b of the control cam 41, and the second friction surface 13b friction engages with the friction surface 33b of the armature 33.

Also, the thickness of the retainer 13 may also be set to a dimension greater than the axial dimension between the control cam 41 and the armature 33. In this case, it is more difficult for force to be generated in the axial direction by the cam follower 42, so relative rotation between the control cam 41 and the armature 33 when the cam mechanism 4 is de-energized is able to be even more effectively restricted.

A ball retaining hole 13c that, rollably retains the cam follower 42 is provided in the retainer 13.

Next, the operation of the electromagnetic clutch 1 according to this example embodiment will be described with reference to FIGS. 1 and 2.

In FIG. 2, when the electric motor, not shown, is driven, the rotational driving force of the electric motor is transmitted to the rotating member 2 via a reduction gear mechanism, not shown, such that the rotating member 2 is rotatably driven.

Normally, when starting the electric motor, the electromagnetic coil 32 or the output mechanism 3 is in a de-energized state, so the magnetic circuit M that starts with the electromagnetic coil 32 is not created, and thus the armature 33 is not pulled toward the electromagnetic coil 32 side via the coil housing 31.

Therefore, in the output mechanism 3, the pressure $P_1$ that becomes the clutch force thereof is not generated, so the friction surface 33a of the armature 33 does not friction engage with the friction surface 310b of the coil holder 310, and thus braking force by the electromagnetic clutch 1 is not transmitted to the rotating member 2.

In this case, the armature 33 presses the retainer 13 and the control cam 41 against the snap ring 12 in an initial position away from the electromagnetic coil 32 by the spring force of the return spring 10, such that the first friction surface 13a of the retainer 13 friction engages with the friction surface 41b of the control cam 41, and the second friction surface 13b of the retainer 13 friction engages with the friction surface 33b of the armature 33.

Accordingly, in this example embodiment, relative rotation between the armature 33 and the control cam 41 is restricted when the electromagnetic coil 32 is not energized.

Therefore, even if there is a sudden change in the rotation speed of the control cam 41, the armature 33 will be able to follow this sudden change in rotation speed, so relative rotation between the control cam 41 and the armature 33 will not occur. As a result, erroneous operation of the cam mechanism 4 when the electromagnetic coil 32 is not energized can be suppressed.

On the other hand, when the electromagnetic coil 32 is energized when the electric motor is driven (i.e., when the rotating member 2 is rotating), the magnetic circuit M that starts at the electromagnetic coil 32 is created, so the armature 33 moves from the initial position to the coil holder 310 side of the coil housing 31, i.e., to the electromagnetic coil 32 side.

Accordingly, the friction surface 33a of the armature 33 friction engages at the pressure $P_1$ with the friction surface 310b of the coil holder 310, and consequently, the cam mechanism 4 operates.

When the cam mechanism 4 operates, the friction surface 33a of the armature 33 friction engages, more strongly with the friction surface 310b of the coil holder 310 at a pressure $P_2$ ($P_1 < P_2$) than before the cam mechanism 4 operates, due to the cam action from the operation of the cam mechanism 4. As a result, braking force from the electromagnetic clutch 1 is transmitted to the rotating member 2.

The effect described below is able to be obtained by the first example embodiment described above.

Erroneous operation of the cam mechanism 4 due to sudden acceleration thereof when the electromagnetic coil 32 is not energized is able to be suppressed.

Figure 3:
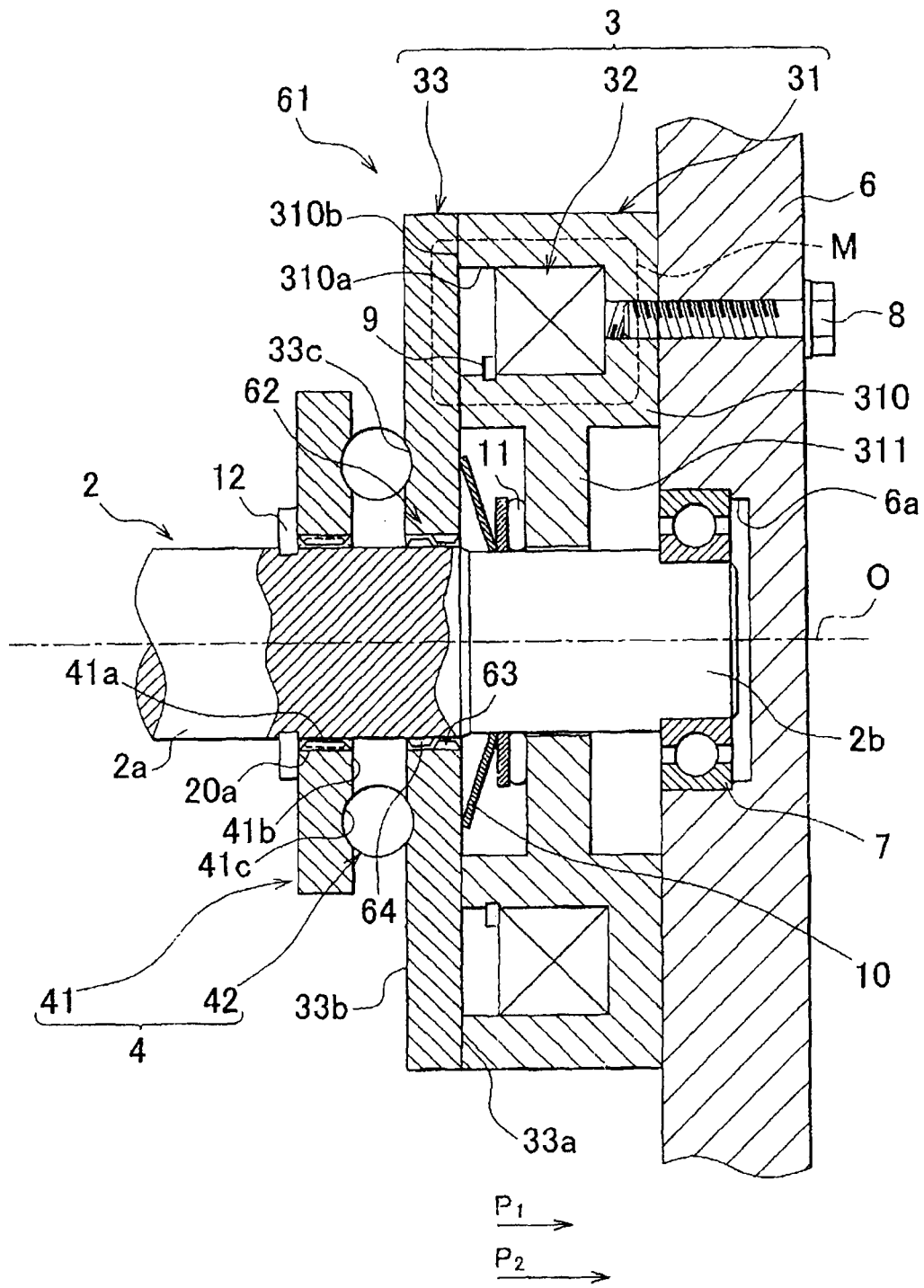
FIG. 3 is a sectional view of an electromagnetic clutch according to a second example embodiment of the invention, in a driven state.
Figure 4:
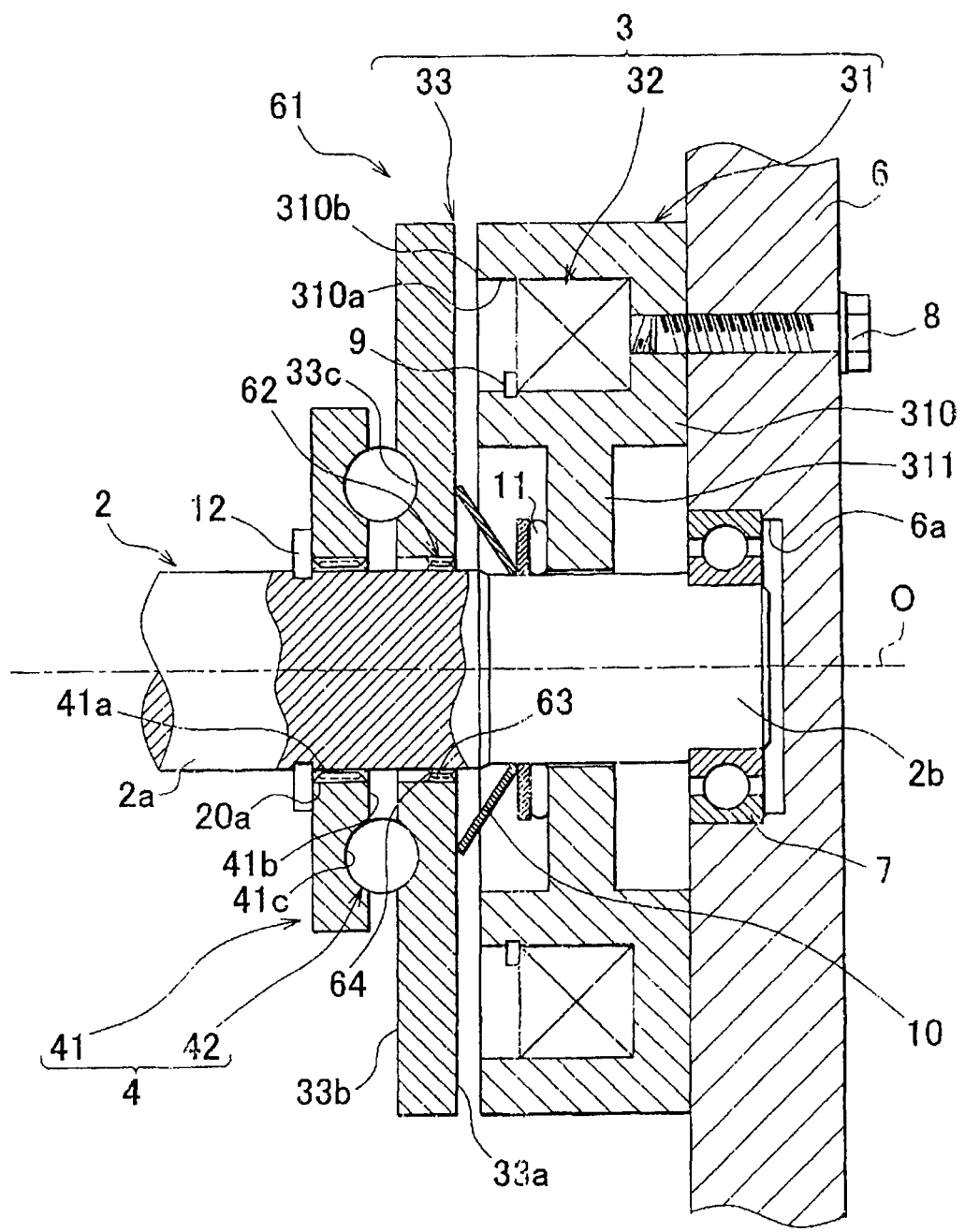
FIG. 4 is a sectional view of the electromagnetic clutch according to the second example embodiment of the invention, in a non-driven state.

Next, an electromagnetic clutch according to a second example embodiment of the invention will be described with reference to FIGS. 3 and 4. FIG. 3 is a view of the electromagnetic clutch in a driven state, and FIG. 4 is a view of the electromagnetic clutch in a non-driven state. In FIGS. 3 and 4, members that are the same as or equivalent to members in FIGS. 1 and 2 will be denoted by the same reference characters, and detailed descriptions of those members will be omitted.

As shown in FIGS. 3 and 4, a relative rotation restricting device 62 of an electromagnetic clutch 61 according to the second example embodiment of the invention is characterized in that relative rotation between the armature 33 and the control cam 41 is restricted by spline engagement.

Therefore, the relative rotation restricting device 62 has a pair of straight spline engaging portions 63 and 64 that are able to engage with each other, and are interposed between the armature 33 and the rotating member 2. The relative rotation restricting device 62 is configured to restrict relative rotation between the armature 33 and the control cam 41 by having the pair of straight spline engaging portions 63 and 64 spline engage together in response to receiving the spring force of the return spring 10.

One straight spline engaging portion 63 is provided on the inner peripheral surface of the armature 33, and the other straight spline engaging portion 64 is provided on the outer peripheral surface of the rotating member 2.

The axial lengths of the straight spline engaging portions 63 and 64 are set to a dimension such that the spline engagement thereof is cancelled by movement of the armature 33 in response to the electromagnetic coil 32 being energized. Therefore, when the electromagnetic coil 32 is energized, the armature 33 moves from the initial position toward the electromagnetic coil 32 side against the spring force of the return spring 10, such that spline engagement of the straight spline engaging portions 63 and 64 is cancelled. On the other hand, when the electromagnetic coil 32 is de-energized, the armature 33 moves to the initial position by the spring force of the return spring 10, such that the straight spline engaging portions 63 and 64 spline engage together.

In the electromagnetic clutch 61 structured in this way, when the electromagnetic coil 32 is de-energized, the spring force of the return spring 10 causes the armature 33 to press the control cam 41 against the snap ring 12 in the initial position away from the electromagnetic coil 32, and the straight spline engaging portions 63 and 64 spline engage together.

Accordingly, in this example embodiment as well, relative rotation between the armature 33 and the control cam 41 when the electromagnetic coil 32 is de-energized can be restricted, just as in the first example embodiment.

Therefore, even if there is a sudden change in the rotation speed of the control cam 41, the armature 33 will be able to follow this sudden change in rotation speed, so relative rotation between the control cam 41 and the armature 33 will not occur. As a result, erroneous operation of the cam mechanism 4 when the electromagnetic coil 32 is not energized can be suppressed.

The same effect obtained with the first example embodiment is also able to be obtained with the second example embodiment described above.

In the example embodiment described above, the electromagnetic clutch functions as a brake device that brakes the rotating member 2, but the invention is not limited to this. That is, the electromagnetic clutch may also function as a driving force transmitting device that transmits driving torque between a pair of rotating members.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An electromagnetic clutch comprising:
   a rotating member;
   an electromagnetic coil that is arranged on a rotational axis of the rotating member and generates electro-magnetic force;
   an output mechanism that has an armature to which return force in a direction away from the electromagnetic coil is applied by a return spring;
   a cam mechanism that is juxtaposed along the rotational axis to the output mechanism, and that has a cam member that is unable to rotate relative to the rotating member, and a cam follower that is able to roll between the cam member and the armature so as to permit limited relative rotation between the armature and the cam member; and
   a relative rotation restricting device that is arranged on an axis of the cam mechanism, and that is configured to restrict relative rotation between the armature and the cam member when the electromagnetic coil is in a de-energized state, the restriction on relative rotation between the armature and the cam member imposed by the relative rotation restricting device restricting the relative rotation to be less than the limited relative rotation permitted by the rolling of the cam follower between the cam member and the armature.

2. The electromagnetic clutch according to claim 1, wherein the armature and the cam member each have a cam groove formed by a concave groove with a depth in an axial direction that changes along a circumferential direction.

3. The electromagnetic clutch according to claim 1, wherein the relative rotation restricting device includes a retainer that is interposed between the armature and the cam member, and that rollably retains the cam follower, and restricts the relative rotation by the retainer friction engaging with the armature and the cam member in response to receiving spring force of the return spring.

4. The electromagnetic clutch according to claim 3, wherein the retainer has a thickness that is set to a dimension that is larger than an axial dimension between the armature and the cam member when the electromagnetic coil is in a de-energized state.

5. An electromagnetic clutch comprising:
   a rotating member;
   an electromagnetic coil that is arranged on a rotational axis of the rotating member and generates electro-magnetic force;
   an output mechanism that has an armature to which return force in a direction away from the electromagnetic coil is applied by a return spring;
   a cam mechanism that is juxtaposed along the rotational axis to the output mechanism, and that has a cam member that is unable to rotate relative to the rotating member, and a cam follower that is able to roll between the cam member and the armature; and
   a relative rotation restricting device that is arranged on an axis of the cam mechanism, and that is configured to restrict relative rotation between the armature and the cam member when the electromagnetic coil is in a de-energized state,
   wherein the relative rotation restricting device includes a retainer that is interposed between the armature and the cam member, and that rollably retains the cam follower, and restricts the relative rotation by the retainer friction engaging with the armature and the cam member in response to receiving spring force of the return spring,
   wherein the retainer has a thickness that is set to a dimension that is the same as an axial dimension between the armature and the cam member when the electromagnetic coil is in a de-energized state.

6. An electromagnetic clutch comprising:
   a rotating member;
   an electromagnetic coil that is arranged on a rotational axis of the rotating member and generates electro-magnetic force;
   an output mechanism that has an armature to which return force in a direction away from the electromagnetic coil is applied by a return spring;
   a cam mechanism that is juxtaposed along the rotational axis to the output mechanism, and that has a cam member that is unable to rotate relative to the rotating member, and a cam follower that is able to roll between the cam member and the armature; and a relative rotation restricting device that is arranged on an axis of the cam mechanism, and that is configured to restrict relative rotation between the armature and the cam member when the electromagnetic coil is in a de-energized state, wherein the relative rotation restricting device includes a pair of spline engaging portions that are interposed between the armature and the rotating member and that are able to engage together, and restricts the relative rotation by the armature spline engaging the pair of spline engaging portions together in response to receiving spring force of the return spring.

7. The electromagnetic clutch according to claim 6, wherein the pair of spline engaging portions has an axial length that is set to a dimension in which a spline engaged state is cancelled by the armature moving in response to the electromagnetic coil being energized.

8. The electromagnetic clutch according to claim 6, wherein one spline engaging portion of the pair of spline engaging portions is provided on an inner peripheral surface of the armature, and the other spline engaging portion is provided on an outer peripheral surface of the rotating member.

* * * * *